Patented Mar. 4, 1952

2,587,597

UNITED STATES PATENT OFFICE 2,587,597

PROCESS FOR REMOVAL OF PIGMENTS FROM PRINTED TEXTILES AND AGENTS USEFUL THEREIN

Alton A. Cook, Glen Ridge, and Ira Sapers, Newark, N. J., assignors to Arkansas Company, Inc., Newark, N. J., a corporation of New York No Drawing. Application July 14, 1949, Serial No. 104,807

6 Claims. (Cl. 8—102)

The present invention relates to procedures and baths for removing organic pigments from printed textiles and other printed materials and agents useful in such procedures.

It has not been found possible to remove phthalocyanine pigments from textiles and other printed materials by stripping operations. These pigments are usually deposited upon the fabrics together with resinous and other binders which not only cause firm adherence of the pigments to the fabrics but also to some extent protect these pigments from attack by chemicals.

Textile materials printed with phthalocyanine pigments cannot be treated in the same manner as indigoid and anthraquinone dyes for complete removal, since they are relatively inert as compared to such dyestuffs and are actually a part of a plastic or resinous coating rather than being integrated into and adsorbed by the fiber.

It is among the objects of the present invention to provide novel procedures and baths for removing pigments from phthalocyanine pigment printed textiles.

It is a particular object of the present invention to provide novel compositions for removing various phthalocyanine pigments which have been imprinted upon textile or other materials.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found possible to remove phthalocyanine pigment colors from textiles in a substantially complete manner by treating them in a bath containing an aliphatic quaternary compound together with caustic soda and sodium hydrosulfite. Anthraquinone may also be included. The aliphatic quaternary compound preferably has one long fatty chain containing 14 to 22 carbon atoms and three short alkyl chains containing 1 to 3 carbon atoms. An alkyl-aryl chain containing 7 or more carbon atoms may be substituted for one of the short alkyl chains, if desired. As illustrative of the compositions and process which is utilized for the purpose of removing phthalocyanine pigments from textile and other printed materials are the following examples:

EXAMPLE I

To give a general bath example:

| Ingredient: | Parts by weight |
|---|---|
| Quaternary compound | 0.5 to 2.0 |
| Caustic alkali | 0.5 to 3.0 |
| Alkali metal hydrosulfite | 0.25 to 2.0 |

EXAMPLE II

To give a specific composition of bath to remove the phthalocyanine pigment:

| | Preferred range by weight |
|---|---|
| Stearyl tri-ethyl ammonium etho-sulfate | 0.5 to 1.5 % |
| Caustic soda | 0.5 to 2.0 % |
| Sodium hydrosulfite | 0.25 to 1.5 % |
| Anthraquinone | .005 to .02% |
| Balance | Water |

The printed textile containing phthalocyanine pigments is introduced into the above bath at 140° F. The temperature of the bath is raised to about 180° F. and the fabric is worked therein for about 30 minutes. Then the temperature is raised to the boiling point and the process continued for 5 minutes to 4 hours, but usually 15 to 60 minutes will suffice.

As a result of this treatment, the phthalocyanine pigments together with other organic pigments which may be present are practically completely removed. In cases where light stains are left, a mild bleaching with sodium hypochlorite at room temperature for 15 to 20 minutes may be employed.

In many cases, a two-step treatment has been found desirable for satisfactory removal of phthalocyanine pigments from printed textile material and is carried out as follows:

Pre-treatment

The goods are introduced into a bath containing 1 to 2% of caustic soda and 0.5 to 1.5% of a surface active agent, such as a sodium alkyl aryl sulfonate, a sulfated alkyl ester or an alkali salt of a fatty acid, and treated in such bath for 30 minutes to two hours at or near a boiling temperature. Alkalies, such as alkali metal phosphates, silicates or carbonates may also be present in this bath.

Following this treatment and after a thorough rinse, the goods are introduced into a second bath containing a quaternary compound, caustic soda, sodium hydrosulfite and anthraquinone, as illustrated in Examples I and II.

In some instances, the addition of other components to this second bath are desirable. Such components are:

(1) condensation products of a water soluble aliphatic amine with a high molecular weight fatty acid or
(2) polyethylene glycol esters of a high molecular weight fatty acid.

EXAMPLE III

As an example of a two bath treatment:

First bath

| | By weight |
|---|---|
| Caustic soda | 1.0% |
| Sodium alkyl aryl sulfonate | 0.5% |
| Tetrasodium pyrophosphate | 0.5% |
| Balance | Water |

The textile material is processed in the bath at the boiling point for about 45 minutes.

Second bath

| | By weight |
|---|---|
| Hexadecyl trimethyl ammonium chloride | 0.5% |
| Caustic soda | 1.0% |
| Sodium hydrosulfite | 0.8% |
| Anthraquinone | 0.01% |
| Balance | Water |

The goods are introduced at a bath temperature of 140° F. The temperature of the bath is then raised to 180° F. and the textiles being treated worked for about 30 minutes. Temperature of the bath is then raised to the boiling point and the process continued for an additional 30 minutes.

EXAMPLE IV

First bath

| | By weight |
|---|---|
| Caustic soda | 1.5% |
| Sulfated butyl oleate | 1.0% |
| Balance | Water |

Second bath

| | By weight |
|---|---|
| Octadecyl triethyl ammonium etho-sulfate | 1.0% |
| Condensation product of stearic acid and tetraethylene pentamine | 0.1% |
| Caustic soda | 1.5% |
| Sodium hydrosulfite | 1.0% |
| Anthraquinone | 0.01% |
| Balance | Water |

EXAMPLE V

First bath

| | By weight |
|---|---|
| Caustic soda | 2.0% |
| Sodium silicate | 0.5% |
| Sodium palmitate | 1.0% |
| Balance | Water |

Second bath

| | By weight |
|---|---|
| Octadecyl triethyl ammonium chloride | 1.5% |
| Stearic acid ester of a polyethylene glycol having a molecular weight of about 1500 | 0.5% |
| Caustic soda | 2% |
| Sodium hydrosulfite | 1.5% |
| Anthraquinone | 0.02% |
| Balance | Water |

EXAMPLE VI

First bath

| | By weight |
|---|---|
| Caustic soda | 1.0% |
| Sodium alkyl aryl sulfonate | 0.25% |
| Soda ash | 0.5% |
| Balance | Water |

Second bath

| | By weight |
|---|---|
| Hexadecyl benzyl dimethyl ammonium chloride | 1.0% |
| Condensation product of palmitic acid with amino ethyl ethanolamine | 0.1% |
| Stearic acid ester of a polyethylene glycol having a molecular weight of about 1000 | 0.2% |
| Caustic soda | 1.5% |
| Sodium hydrosulfite | 1.0% |
| Anthraquinone | 0.01% |
| Balance | Water |

The procedure as illustrated by the above examples has been found highly efficient for the removal of phthalocyanine pigments embodied in resinous and cellulosic coatings. In addition, it has also been found effective in removing other types of organic pigments, such as azo and nitroso pigments, which may be present in such coatings.

If desired, as a final step the textile fabric may be treated with sodium hypochlorite at a suitable concentration at room temperature for 15 to 20 minutes.

Then, the textile material may be treated with sodium bisulfite and neutralized with a mild alkali.

Although many pigments might be removed in this manner, it was found that this procedure is particularly effective when phthalocyanine pigments are used.

It has been found that all types of phthalocyanine pigments yield to this treatment, including the following:

Metal phthalocyanine pigments
Metal-free phthalocyanine pigments
Halogenated phthalocyanine pigments The following compositions may be dispersed in water to give effective in pigment removal baths in the proportion of ½ to 5% by weight:

EXAMPLE VII

| | Parts |
|---|---|
| Octadecyl triethyl ammonium etho-sulfate | 75 |
| Condensation product of stearic acid and tetraethylene pentamine | 5 |
| Water | 20 |

EXAMPLE VIII

| | Parts |
|---|---|
| Octadecyl trimethyl ammonium chloride | 60 |
| Stearic ester of a polyethylene glycol having a molecular weight of about 1500 | 10 |
| Water | 30 |

EXAMPLE IX

| | Parts |
|---|---|
| Hexadecyl benzyl dimethyl ammonium chloride | 50 |
| Condensation product of palmitic acid and triethylenetetramine | 5 |
| Stearic acid ester of a polyethylene glycol having a molecular weight of about 1000 | 10 |
| Water | 35 |

These products may be prepared in the form of stable homogeneous paste which may be readily dispersed in water to form the pigment removal baths or second baths as described in Examples I to VI.

To illustrate the manufacture of the components of the above pigment removal baths, the following examples are given:

Quaternary compound

To 264 parts of technical octadecylamine in molten condition at 100 to 110° C. are added 106 parts of finely powdered sodium carbonate with continuous stirring. Then 154 parts of diethyl sulfate are run slowly into the slurry, the rate of addition being at such a rate to maintain the temperature range given above.

The temperature of the mass is then raised to 115° C. and an additional 106 parts of sodium carbonate are added with continuous stirring.

Then 308 parts of diethyl sulfate are gradually added over a period of about 2 hours and the temperature is gradually increased to 130° C. This temperature is maintained for 15 to 20 minutes to complete the reaction.

The result of the above reaction is a hard, light tan colored solid which exhibits marked stability toward solutions of sulfuric acid and sodium hydroxide.

Other quaternary compounds may also be employed such as:

Cetyl trimethyl ammonium bromide
Cetyl dimethyl ethyl ammonium bromide
Tetradecyl dimethyl benzyl ammonium chloride
Octadecyl dimethyl benzyl ammonium chloride
Octadecyl dimethyl ethyl ammonium chloride
Octadecyl trimethyl ammonium chloride

Amino condensation product

For example, the condensation product is desirably prepared by condensing non-hydroxylated polyamines having 4 to 10 carbon atoms and 3 to 6 nitrogen atoms with high molecular weight fatty acids containing 12 to 32 carbon atoms. Generally, the polyamine should be in excess of equi-molar proportions and the condensation is achieved by heating the mixture to 160 to 230° C. for one hour to three hours, followed by cooling rapidly to between 90 to 100° C.

Among the polyamines which may be utilized are:

Di-ethylene triamine
Tri-ethylene tetramine
Tetra-ethylene pentamine
Penta-ethylene hexamine To give a specific example, a mixture of 1 mol of stearic acid and 1.1 mols of tetraethylene pentamine is heated to 180° to 220° C. for 1 to 3 hours or until the acid number of the mixture is reduced to about 2.

The other amino condensation products are prepared in the same manner.

Polyethylene glycol esters of a fatty acid 2 mols of stearic acid are heated with 1.1 mols of a polyethylene glycol having a molecular weight of approximately 1500 at 115° to 120° C. until the acid number of the mixture is reduced to 10 or below. The other polyethylene glycol ester products are prepared in the same manner. The glycols should have a molecular weight of 1000 to 4000.

The preferred fatty acids used in the above procedure are myristic, palmitic and stearic. Oleic, ricinoleic and linoleic acids are not desirably used. The fatty acids which are used may be the commercial grades or the fatty acid mixtures may be derived by hydrolysis from palm oil, tallow, Japan wax, and hydrogenated glycerides. If desired, mono-, di-, or tri-glycerides may be used directly in condensation reaction.

The embodiment of the invention shown and described herein is to be considered merely as illustrative; as the invention is susceptible to variation, modification and change within the spirit and scope of the appended claims.

The present application is a continuation-in-part of application Ser. No. 670,549, filed May 17, 1946, now Patent Number 2,525,770.

Having now particularly described and ascertained the nature of the invention, and in what manner the same is to be performed, what is claimed is:

1. A process of removing imprinted phthalocyanine pigments embodied in water insoluble resinous binders from textiles, which comprises immersing the fabrics in an aqueous dispersion containing a quaternary ammonium compound, caustic soda and an alkali metal hydrosulfite.

2. A process of removing imprinted phthalocyanine pigments embodied in water insoluble resinous binders from textiles, which comprises immersing the imprinted fabric at about a temperature of 140° F. in an aqueous bath containing stearyl tri-ethyl ammonium etho-sulfate, caustic soda, sodium hydrosulfite and anthraquinone, raising the temperature of the bath to about 180, F. while working the fabric therein for about thirty minutes and then raising the temperature to the boiling point and continuing for fifteen minutes to four hours.

3. A process of removing imprinted phthalocyanine pigments embodied in water insoluble resinous binders from textiles, which comprises immersing the imprinted fabric in an aqueous bath containing 0.5 to 1.5% stearyl tri-ethyl ammonium etho-sulfate, 0.5 to 2.0 caustic soda, 0.25% to 1.5% sodium hydrosulfite, .005 to .02% anthraquinone and the balance water.

4. A process of removing imprinted phthalocyanine pigments embodied in water insoluble resinous binders from textiles, which comprises immersing the printed textile in an aqueous bath containing 1.0% caustic soda, 0.25% sodium alkyl aryl sulfonate, 0.5% soda ash and the balance water and then in a second bath 1.0% hexadecyl benzyl dimethyl ammonium chloride, 0.1% condensation product of palmitic acid with amino ethyl ethanolamine, 0.2% stearic acid ester of a polyethylene glycol having a molecular weight of about 1000, 1.5% caustic soda, 1.0% sodium hydrosulfite, 0.01% anthraquinone and the balance water.

5. A method of removing resinous deposits upon textiles carrying phthalocyanine pigment colors which comprises treating the textile material in a bath of 140° F. to 180° F. for about 30 minutes followed by a further treatment at the boiling point for an additional 30 minutes, said bath containing octadecyl triethyl ammonium etho-sulfate, condensation product of stearic acid and tetraethylene pentamine, caustic soda, sodium hydrosulfite, anthraquinone and the balance water.

6. A method of removing resinous deposits upon textiles carrying phthalocyanine pigment colors which comprises treating the textile material in a bath of 140° F. to 180° F. for about 30 minutes followed by a further treatment at the boiling point for an additional 30 minutes, said bath containing 1.0% octadecyl triethyl ammonium etho-sulfate, 0.1% condensation product of stearic acid and tetraethylene pentamine, 1.5% caustic soda, 1.0% sodium hydrosulfite, 0.1% anthraquinone and the balance water.

ALTON A. COOK.
IRA SAPERS.

REFERENCES CITED

The following references are of record in the file of this patent:

UNITED STATES PATENTS

| Number | Name | Date |
|---|---|---|
| 276,029 | Greene | Apr. 17, 1883 |
| 1,274,184 | Moness | July 30, 1918 |
| 1,889,154 | Reddelien | Nov. 29, 1932 |
| 2,003,928 | Evans | June 4, 1935 |
| 2,019,124 | Evans | Oct. 29, 1935 |
| 2,052,612 | Dunbar | Sept. 1, 1936 |
| 2,185,163 | Ulrich | Dec. 26, 1939 |
| 2,201,041 | Katz | May 14, 1940 |
| 2,320,281 | Kalusdian | May 25, 1943 |
| 2,328,586 | Ross | Sept. 7, 1943 |
| 2,464,806 | Haddock | Mar. 22, 1949 |
| 2,525,770 | Cook et al. | Oct. 17, 1950 |